(12) United States Patent
Busker

(10) Patent No.: US 12,110,868 B2
(45) Date of Patent: Oct. 8, 2024

(54) WIND PARK CONTROLLER, METHOD FOR PROVIDING DATA, WIND TURBINE, AND METHOD FOR RECEIVING DATA

(71) Applicant: Wobben Properties GmbH, Aurich (DE)

(72) Inventor: Kai Busker, Großefehn (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 429 days.

(21) Appl. No.: 16/628,596

(22) PCT Filed: Jun. 12, 2018

(86) PCT No.: PCT/EP2018/065470
§ 371 (c)(1),
(2) Date: Jan. 3, 2020

(87) PCT Pub. No.: WO2019/007643
PCT Pub. Date: Jan. 10, 2019

(65) Prior Publication Data
US 2020/0191118 A1      Jun. 18, 2020

(30) Foreign Application Priority Data

Jul. 6, 2017   (DE) .................... 10 2017 115 154.0

(51) Int. Cl.
*F03D 7/04*   (2006.01)
*F03D 7/02*   (2006.01)
*F03D 9/25*   (2016.01)

(52) U.S. Cl.
CPC ........... *F03D 7/048* (2013.01); *F03D 7/0284* (2013.01); *F03D 9/257* (2017.02); *F03D 7/047* (2013.01);
(Continued)

(58) Field of Classification Search
CPC ........ F03D 7/048; F03D 9/257; F03D 7/0284; F03D 7/047; F05B 2270/1033;
(Continued)

(56) References Cited

U.S. PATENT DOCUMENTS 8,219,356 B2   7/2012   Mihok et al.
8,239,702 B2   8/2012   Bengtson
(Continued)

FOREIGN PATENT DOCUMENTS

CN   102128134 A   7/2011
CN   102144093 A   8/2011
(Continued)

OTHER PUBLICATIONS

Meng, "Design of Remote Data Collection System of Main Ventilator Based on CDMA 1X Network," *Industry and Mine Automation* 2:32-34, Feb. 2010. (3 pages; with English abstract).
(Continued)

*Primary Examiner* — Joseph Ortega
(74) *Attorney, Agent, or Firm* — Seed IP Law Group LLP

(57) ABSTRACT

A method for providing data sets for the units, in particular wind turbines, of a wind park. The wind park is divided into at least two groups, wherein at least one group, a plurality of groups or all groups in each case have at least two units. An individual data set is first generated in each case for each of the groups. A data packet which comprises at least the generated individual data sets is then generated and the data packet is then transmitted to all units of the wind park. A wind park controller, a method for receiving a data set, a unit and a wind park is also provided.

16 Claims, 4 Drawing Sheets

(52) U.S. Cl.
CPC . *F05B 2270/1033* (2013.01); *F05B 2270/335* (2013.01); *F05B 2270/337* (2013.01)

(58) Field of Classification Search
CPC ......... F05B 2270/335; F05B 2270/337; Y02E 10/723; H04L 12/1895
See application file for complete search history.

(56) References Cited

U.S. PATENT DOCUMENTS

| | | | |
|---|---|---|---|
| 8,373,291 B2 | 2/2013 | Zeumer et al. | |
| 8,650,333 B2* | 2/2014 | Shinomiya | G08C 17/00 |
| | | | 710/18 |
| 9,026,258 B2 | 5/2015 | Stapelfeldt | |
| 9,496,812 B2 | 11/2016 | Kragelund et al. | |
| 10,072,634 B2 | 9/2018 | Busker | |
| 10,161,385 B2 | 12/2018 | Busker et al. | |
| 10,174,742 B2 | 1/2019 | Diedrichs | |
| 10,270,287 B2 | 4/2019 | Beekmann | |
| 2011/0004356 A1 | 1/2011 | Garcia | |
| 2011/0175353 A1* | 7/2011 | Egedal | F03D 7/048 |
| | | | 290/44 |
| 2015/0219075 A1* | 8/2015 | Cardinal | F03D 7/048 |
| | | | 290/44 |
| 2015/0267683 A1* | 9/2015 | Ubben | F03D 9/257 |
| | | | 290/44 |
| 2016/0146190 A1 | 5/2016 | Ravindra et al. | |
| 2018/0242057 A1 | 8/2018 | Demuth | |
| 2018/0266397 A1 | 9/2018 | Ristau et al. | |
| 2018/0347545 A1 | 12/2018 | Demuth | |

FOREIGN PATENT DOCUMENTS

| | | |
|---|---|---|
| CN | 102460324 A | 5/2012 |
| CN | 102607850 A | 7/2012 |
| CN | 102948166 A | 2/2013 |
| CN | 103161668 A | 6/2013 |
| CN | 103527406 A | 1/2014 |
| CN | 105121841 A | 12/2015 |
| CN | 105191047 A | 12/2015 |
| CN | 106647580 A | 5/2017 |
| DE | 102007044601 A1 | 4/2009 |
| DE | 102015201431 A1 | 7/2016 |
| EP | 2563039 A1 | 2/2013 |
| EP | 3 002 453 A1 | 4/2016 |
| EP | 2902624 B1 | 9/2016 |
| RU | 2608955 C2 | 1/2017 |
| WO | 2012/056564 A1 | 5/2012 |
| WO | 2017/032478 A1 | 3/2017 |
| WO | 2017/054966 A1 | 4/2017 |
| WO | 2017/089129 A1 | 6/2017 |

OTHER PUBLICATIONS

Yunqi et al., "Power Control Strategy of Wind Farm Through Improving Scheduling Reliability of Wind Turbine," *ACTA Energiae Solaris Sinica* 36(12):2888-2894, Dec. 2015. (8 pages; with English abstract).

* cited by examiner

WIND PARK CONTROLLER, METHOD FOR PROVIDING DATA, WIND TURBINE, AND METHOD FOR RECEIVING DATA

BACKGROUND

Technical Field

The invention relates to data communication in a wind park, i.e., between a wind park controller and units of the wind park, such as wind turbines, energy stores or STATCOM units.

Description of the Related Art

According to the prior art, wind parks have a multiplicity of units. These units relate, in particular, to wind turbines, wherein units such as energy stores which serve to stabilize the energy provided by the wind park or STATCOM units which serve to provide network services are also comprised. These units of a wind park have internal controllers which internally control a control variable, for example the energy output of the individual unit, by means of predefined controlling control variables. The controlling control variables for the units are normally provided by a higher-level wind park controller of the wind park. These controlling control variables can vary accordingly during operation and are thus provided in repeatedly updated form by a wind park controller for the units.

A wind park accordingly has a two-stage control path. Here, a first, i.e., a higher-level, controller stage is provided by a wind park controller which determines control variables, also referred to below as controlling control variables, for individual units of the wind park, for example the wind turbines of the wind park. These control variables are then considered as reference variables or setpoints in controllers of the individual units and are fed there to a second, i.e., a lower-level, controller structure.

The German Patent and Trademark Office has identified the following prior art in the priority application for the present application: US 2015/0219075 A1 and DE 10 2007 044 601 A1.

BRIEF SUMMARY

The present invention relates to the transmission to the individual units of a controlling control variable determined with the wind park controller and therefore relates to the aforementioned higher-level control path. The wind park controller obtains its actual values via feedback, for example from a measuring point in the area of a network feed-in point of the wind park, which is also referred to as a network node. This means that values, such as, for example, the voltage, frequency, active power and/or reactive power which the units make available and which are fed into a supply network are measured and provided as an actual value at the network node at which all units of the wind park jointly feed energy into the network. This actual value is supplied to the wind park controller which determines and provides control variables or controlling control variables for the units depending on a similarly provided reference variable. The wind park controller obtains its reference variable, for example, from a network operator or a high-level cluster controller.

The controlling control variables provided by the wind park controller for the units are transmitted to the individual units of the wind park via a data line which, for data security reasons, is designed as an electrical line. However, due to the physical characteristics of these data lines, particularly in existing, older-generation wind parks, a data transmission rate is limited, so that only a maximum number of data packets can be transmitted in a specific time period from the wind park controller to the individual units.

Particularly for network services, such as network support, varying controlling control variables are to be provided by the wind park controller with an update rate of a few seconds or even under one second for the wind turbines. In order to guarantee the temporal requirements of the response of the individual units to modified controlling control variables, the individual units of a wind park cannot be addressed individually by the wind park controller, since the data rate, particularly in old wind parks, is insufficient for this purpose. In some instances, wind parks have data rates which are so low that the time period required by the network for control adjustment just allows the transmission and reception of a single data packet. A response time of all units with separate addressing of the units by means of an individual data record would thus be inadequate.

To counteract this, data packets are transmitted by the wind park controller which are designed as a broadcast. This means that all units of the wind park are addressed by one data packet or receive this data packet and accept the controlling control variable contained in the data packet according to the update rate in order to update the controlling control variable of the previously received by means of a data packet.

If, for example, an energy oversupply is accordingly present and the total power output of the wind park needs to be restricted, a reduced value for the active power of the wind park to be output is divided in the wind park controller into the proportions for the individual units and this reduced active power controlling control variable is supplied in the broadcast to all units. All units then reduce their generated active power accordingly, for example by a predefined percentage proportion.

This situation is disadvantageous for the wind park operator, particularly if the wind park consists of wind turbines which were installed at different times and therefore command different tariffs. It would thus be desirable to reduce the energy output of wind turbines whose energy commands lower tariffs relatively more substantially than the energy output of the wind turbines whose energy commands relatively higher tariffs. Embodiments on the one hand, enable a fast control of the wind turbines of a wind park which meets the requirements of the network operators and, on the other hand, enable an individualized control of the wind turbines, for example depending on their installation date or their position in the wind park. Provided is a method for providing data sets for units of a wind park. The units are, for example, wind turbines, one or more STATCOM units and/or one or more energy stores. The wind park is divided into at least two groups. At least one group, a plurality of groups or each group comprise(s) at least two of the units. According to the method, an individual data set is generated in each case for each of the groups. If, for example, two groups are defined, a first data set is generated for the first group and a second data set is generated for the second group.

A data packet is then generated which comprises the individual data sets. A data packet in each case therefore contains a data set for each group. The data packet is then transmitted to all units of the wind park.

Provided is a method for receiving a data packet, in particular the aforementioned transmitted data packet. This method is preferably carried out with a unit of a wind park. The wind park has a plurality of units. The units of the wind park are further subdivided into at least two groups, wherein at least one group, a plurality of groups or all groups in each case have at least two units. The method for receiving data further comprises the steps of receiving a data packet which comprises at least individual data sets in each case for each of the groups. Data sets are furthermore extracted from the data packet for the group to which the unit is assigned. Finally, the extracted data sets are used in the unit.

A plurality of data sets are therefore provided in a data packet which is provided for all units, wherein each data set is to be assigned in each case individually to precisely one group of the units. This data packet is fed to all units and is received by all units. The data packet can therefore be transmitted in a broadcast. Each unit then extracts from this data packet the data set which is assigned to the group to which the respective receiving unit is assigned and uses this extracted data set, whereas the data sets which are intended for other groups are ignored. All wind turbines can thus be reached simultaneously with a single data packet. An individual control of at least two groups is simultaneously possible. An individual addressing of each individual unit by a wind park controller is therefore not necessary. For this purpose, a data packet has a bit length which enables at least two individual data sets to be contained therein.

According to a first embodiment, the individual data sets comprise control signals, a controlling control variable, in particular an active power controlling control variable or wind power controlling control variable, or a reserve power. According to this embodiment, control signals, for example, or controlling control variables are provided accordingly by the individual data in the providing method, and control signals or controlling control variables are extracted accordingly from the data packet as a data set according to the receiving method.

According to a further embodiment, along with the individual data sets, the data packet in each case also comprises at least one global data set for each of the groups, said data set being provided for a plurality of groups or for all groups. Along with the pre-definition of different data sets for different groups, the provision of a global data set for a plurality of units or for all units is therefore also possible with a single data packet. According to the method, a data packet is thus generated which contains a plurality of individual data sets in each case for each of the groups and additionally at least one global data set. According to this example embodiment, an individual data set is extracted accordingly by a unit from the data packet which is assigned to the group to which the unit is assigned. Along with the individual data set, the unit furthermore also extracts a global data set. The simultaneous predefinition of a global data set for all units and the individual predefinition of an individual data set for different groups of units is thus possible with one data packet.

According to a further embodiment, the individual data correspond to active power controlling control variables and the global data to reactive power controlling control variables. In the providing method, active power controlling control variables are individually determined for each individual group of units and are inserted as an individual data set into a data packet in each case for each of the groups. A generated reactive power controlling control variable is additionally added to the same data packet as a global data set. According to the receiving method, a data packet is correspondingly received in a unit according to this embodiment and the active power controlling control variable which is assigned to the group to which the unit is assigned is extracted from the data packet. Along with this active power controlling control variable which is determined individually for the group to which the wind turbine which receives the data packet is assigned, a reactive power controlling control variable corresponding to a global data set of the data packet is additionally extracted from the same data packet.

As a result, in the case of a reactive power modification which is predefined by the network operator and is intended to be provided by the wind park for network support, it is possible for this reactive power to be provided simultaneously by all wind turbines. Conversely, the active power can be modified with an individual proportion for different groups.

According to a further embodiment, the wind park comprises at least two groups, wherein all wind turbines which have already fed energy into a network before a predetermined date or were connected to the network before the date are assigned to one of these groups, whereas the wind turbines which have not fed energy into a network or were not connected to the network until after the predetermined date are assigned to the other group(s). A data packet with an individual active power controlling control variable which allows the wind turbines of the first group to output a comparatively higher active power than the units of the other groups is preferably fed to the wind turbines which are assigned to the group which was already connected to the network or has fed energy into said network before the predefined date.

In the case of a limitation of the active power predefined by the network operator, new wind turbines commanding lower tariffs can thus be limited more substantially in terms of their active power output than wind turbines commanding higher tariffs. This furthermore takes place during the transmission of a single data packet which is transmitted to all wind turbines. A very fast response to requirements of the network operator is therefore possible and prescribed limits can be adhered to within prescribed response times. At the same time, different groups of units can be controlled differently by the individual data sets.

According to a further embodiment, different standard values, which can also be referred to as default values, are assigned to the units which are assigned to different groups. Standard values are used to control the unit if the reception of data packets is affected by interference. These default or standard values are, for example, standard values for active power controlling control variables or reactive power controlling control variables or a reserve power.

Provided is a wind park controller to carry out the method for providing data, and a unit, i.e., in particular, a wind turbine, to carry out the method for receiving data packets. Provided is a wind park with a wind park controller for providing data packets and a plurality of wind turbines for receiving data packets.

BRIEF DESCRIPTION OF THE SEVERAL VIEWS OF THE DRAWINGS

Further embodiments can be found in the example embodiments explained in detail in the figures.

DETAILED DESCRIPTION

Figure 1:
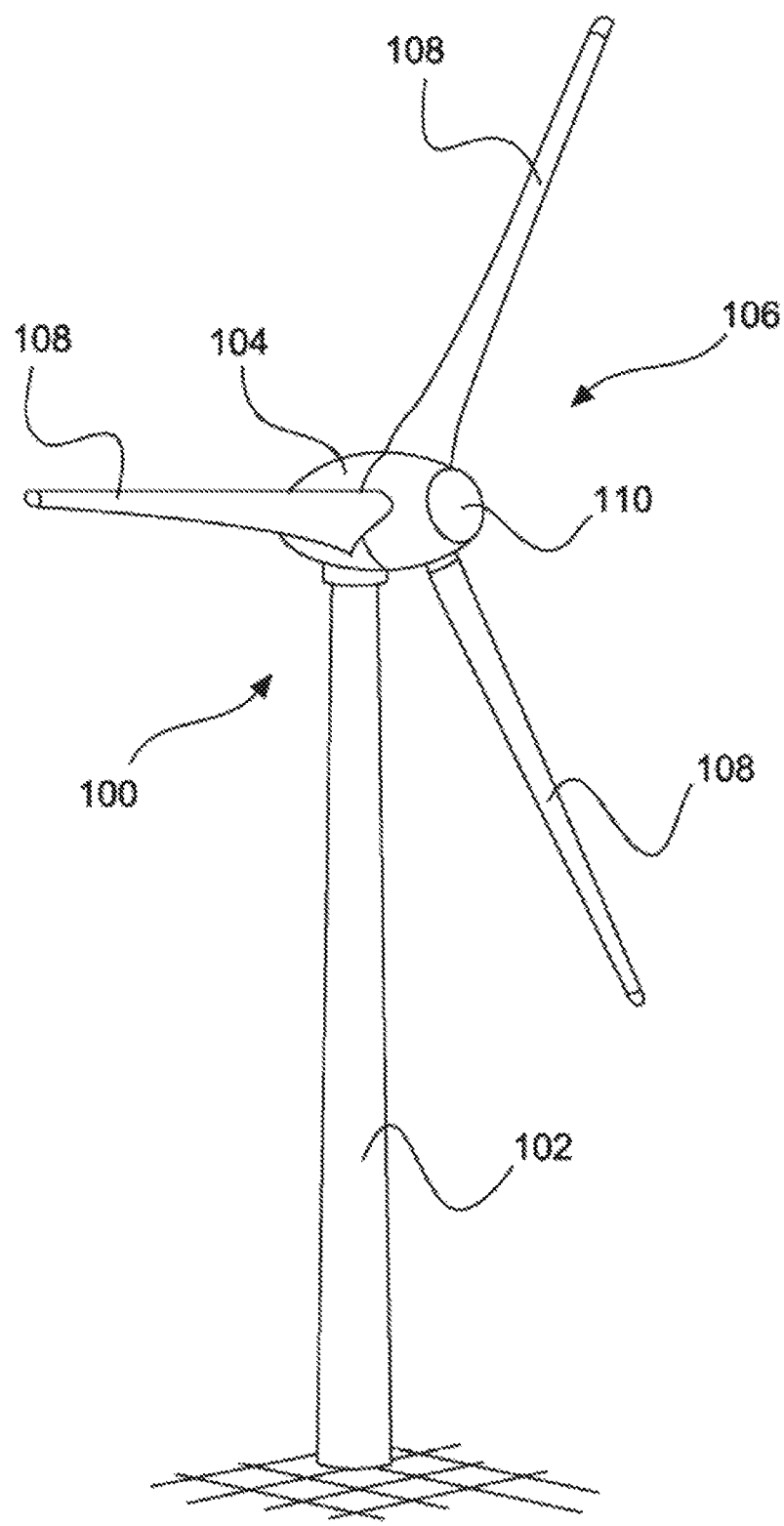
FIG. 1 shows a wind turbine.

FIG. 1 shows a schematic view of a unit 100, i.e., a wind turbine 100, of a wind park 112. The wind turbine 100 has a tower 102 and a nacelle 104 on the tower 102. An aerodynamic rotor 106 with three rotor blades 108 and a spinner 110 is provided on the nacelle 104. During the operation of the wind turbine, the aerodynamic rotor 106 is set in rotational motion by the wind and therefore also rotates a rotor or winding of a generator which is directly or indirectly coupled to the aerodynamic rotor 106. The electrical generator is disposed in the nacelle 104 and generates electric power. The pitch angles of the rotor blades 108 can be modified by pitch motors on the rotor blade roots of the respective rotor blades 108.

Figure 2:
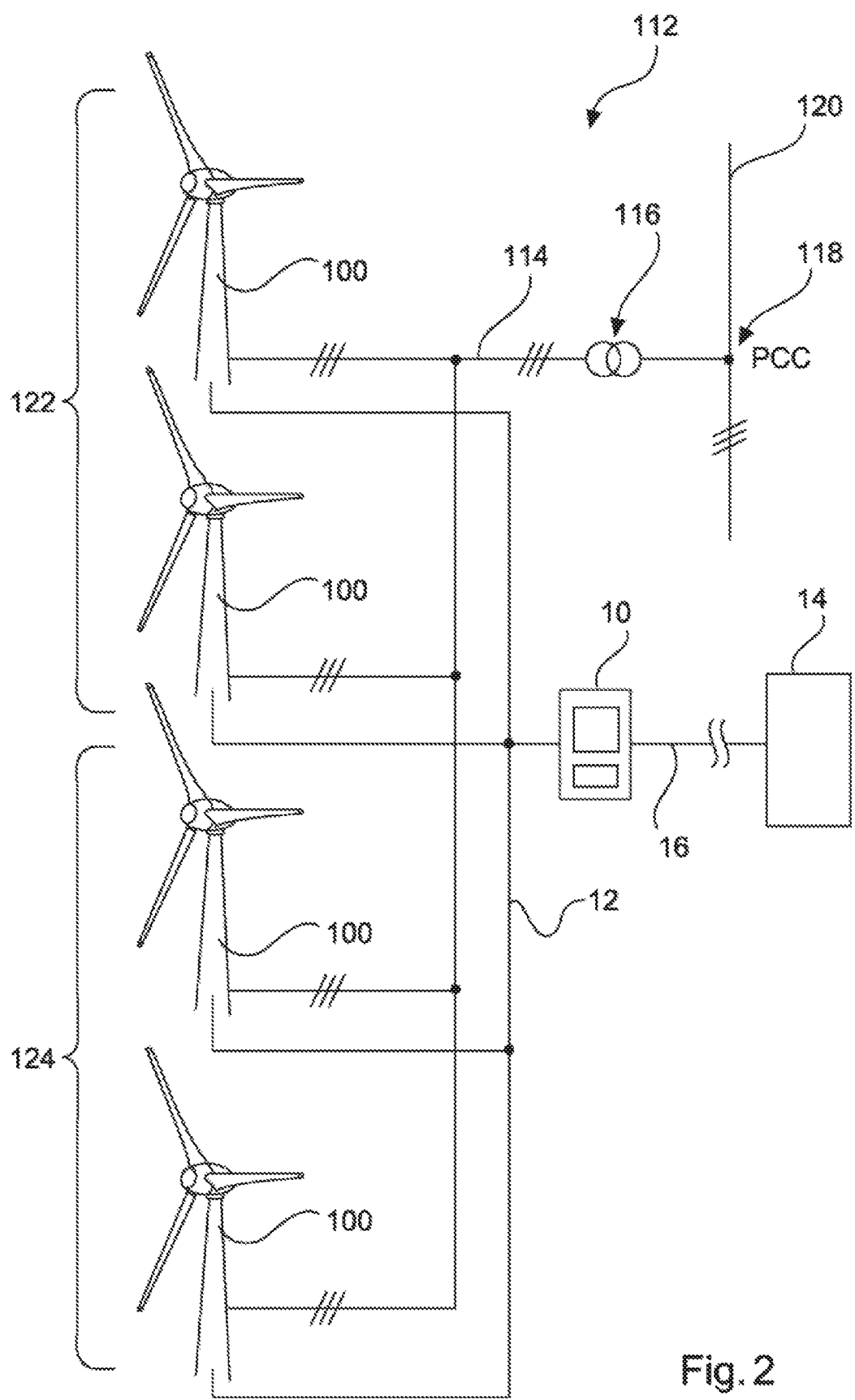
FIG. 2 shows a wind park.

FIG. 2 shows a wind park 112 with, by way of example, four wind turbines 100, which may be identical or different. The four wind turbines 100 thus represent essentially any number of wind turbines 100 of a wind park 112. The wind turbines 100 provide their power, i.e., in particular, the generated current, via an electric wind park network 114. The currents or powers of the individual wind turbines 100 generated in each case are added together and a transformer 116 is usually provided to step up the voltage in the wind park 112 and then feed it at the feed-in point 118, which is also generally referred to as the PCC, network node or network feed-in node into the supply network 120.

FIG. 2 is only a simplified representation of a wind park 112. The wind park network 114 can also, for example, be designed differently in that, for example, a transformer 116 is also present at the output of each wind turbine 100, to mention only one other example embodiment.

According to this example embodiment, the wind turbines 100 are divided into two groups 122, 124. The upper two wind turbines 100 are assigned to a first group 122 and the lower two wind turbines 100 are assigned to a second group 124.

FIG. 2 furthermore shows a controller 10, in this case a wind park controller 10, which is connected via a bus system 12 to each individual wind turbine 100. FIG. 2 furthermore shows a control center 14 of an operator, i.e., a network operator or a wind park operator. The data transmission between the wind park controllers 10 and the wind turbines 100 is considered in detail in the present example embodiment. The control center 14 is connected via a connection 16 to a data input 15 of the wind park controller 10. The connection 16 corresponds, for example, to a TCP/IP connection.

Figure 3:
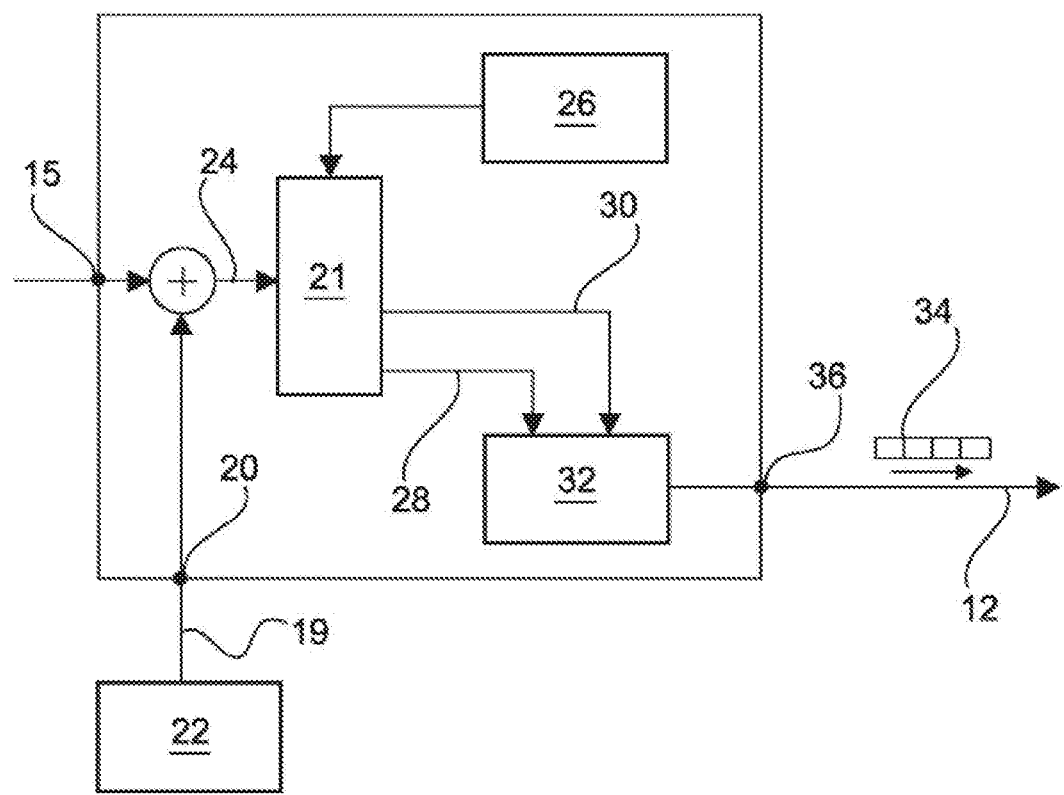
FIG. 3 shows a wind park controller.

FIG. 3 shows an enlarged view of the wind park controller 10. The wind park controller 10 comprises a data input 15 via which the wind park controller 10 is connected to the control center 14 of an operator. The wind park controller 10 furthermore has a further data input 20 to which a feedback 19 of the control circuit which is controlled with a controller 21 of the wind park controller 10 is fed. The feedback 19 is connected to a measuring point 22 which is arranged in the vicinity of the feed-in point 118 and measures electrical quantities of the wind park network 114. These electrical quantities are, for example, the voltage and/or the frequency of the electrical current or the electrical voltage in the wind park network 114. A control deviation 24 is defined in the wind park controller 10 by feeding the feedback 19 via the data input 20 and a reference variable specified by the operator via the data input 15. The control deviation 24 is fed to the controller 21 which defines a control variable for the units 100 of the wind park 112.

Here, the controller 21 defines individual control variables for different groups of units 100 of the wind park 112. For this purpose, information relating to the number of groups and the number of units 100 which are assigned to the individual groups is assigned to the controller 21 from a memory 26. The characteristics which the individual units of a group have are furthermore stored in the memory 26. If two groups of the wind park 112 are assumed in the present example, the controller 21 thus defines a first data set 28 and a second data set 30 which are determined individually for two different groups of units 100. These two individual data sets 28, 30 are then fed to a data packet generator 32 which generates a data packet 34 from these two data sets 28, 30 and outputs it at the output 36. The data packet 34 with the two data sets 28, 30 is thus provided on the bus line 12.

The data packet 34 can optionally also contain at least one global data set, wherein this is not shown in the present example embodiment.

Figure 4:
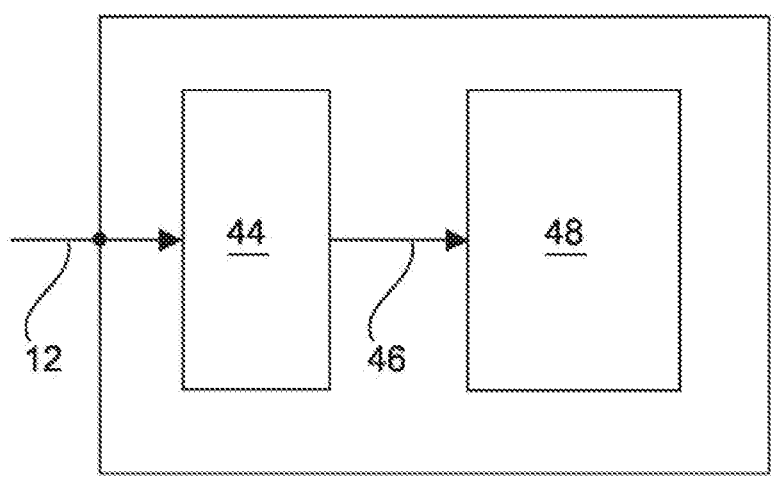
FIG. 4 shows a unit.

FIG. 4 shows a section from a unit 100, i.e., only the control 40 of a unit 100. The control 40 has a data input 42 to which the data packet 34 is fed via a bus line 12. The data packet 34 is then fed to an extracting unit 44. The extracting unit 44 extracts from the data packet 34 the data set 28, 30 which is assigned to the group to which the unit 100 is also assigned. The extracted data set 46 is then fed to a controller 48 of the unit 100 to control the unit 100.

Figure 5:
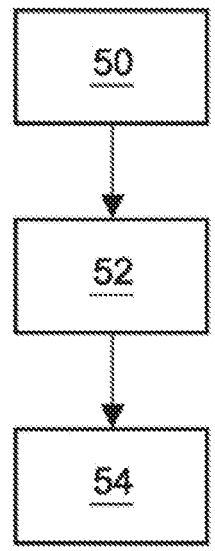
FIG. 5 shows the steps of the method for providing a data set.

FIG. 5 shows the steps of a method for providing a data set 28, 30.

In a step 50, individual data sets 28, 30 are generated in each case for each of the groups 122, 124 of a plurality of units 100 of a wind park 112 and, in step 52, a data packet 34 is generated from the individual data sets 28, 30. In step 54, the data packet 34 is transmitted to all units 100 of a wind park 112.

Figure 6:
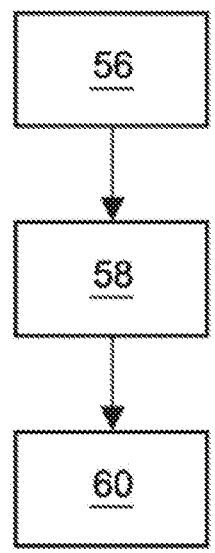
FIG. 6 shows the steps of the method for receiving a data set.

FIG. 6 shows the steps of the method for receiving data by means of a unit 100, wherein, in step 56, a data packet 34 which comprises at least individual data for each of the groups 122, 124 of units 100 of a wind park is received and, in step 58, the data set 28, 30 is extracted from the data packet 34 for the group 122, 124 to which the unit 100 is assigned. In step 60, the extracted data set 46 is then used in the unit 100.

The invention claimed is:

1. A method comprising:
   providing data sets for a plurality of units of a wind park, wherein the wind park is divided into at least first and second groups, and wherein at least one group of the first and second groups comprises at least two units, the providing comprising:
   generating an individual data set in each case for each of the at least first and second groups;
   generating a data packet comprising at least the generated individual data sets and a global data set for the at least first and second groups, wherein:
   active power controlling control variables are generated as the generated individual data sets,
   reactive power controlling control variables are generated as the global data set, and
   the global data set is the same for the at least first and second groups; and
   transmitting the data packet to the plurality of units of the wind park.

2. The method as claimed in claim 1, wherein generating the individual data set includes generating the individual data sets with one or more of: control signals, a controlling control variable, and a reserve power.

3. The method as claimed in claim 1, wherein the plurality of units feed energy for a first time into a connected network or are connected to the network before a predefined date are assigned to the first group and at least the second group contains the remaining units of the wind park.

4. The method as claimed in claim 1, wherein individual standard values are provided for the plurality of units, wherein the standard values have same values for the plurality of units of a same group of the first and second groups and have different values for different groups of the first and second groups.

5. A wind park controller comprising circuitry configured to carry out the method as claimed in claim 1.

6. A wind park comprising the wind park controller as claimed in claim 5 and the plurality of units.

7. The method as claimed in claim 1, further comprising:
receiving the transmitted data sets by the plurality of units of the wind park, the receiving comprising:
  receiving the data packet;
  extracting at least the respective individual data set from the data packet for the respective group to which the unit is assigned; and
  using the extracted data set in the unit.

8. The method as claimed in claim 7, wherein the individual data set contains control signals used in the unit to control the unit, or the individual data set comprises a controlling control variable.

9. The method as claimed in claim 8, wherein the controlling control variable comprises an active power controlling control variable or a reactive power controlling control variable used to control the unit.

10. The method as claimed in claim 7, wherein the unit extracts the global data set and uses the extracted global data set in the unit.

11. The method as claimed in claim 10, wherein the active power controlling control variable and the reactive power controlling control variable are used to control the unit.

12. The method as claimed in claim 7, wherein the unit is assigned to a first group if the unit has fed energy into a connected network for the first time or was connected to the network before a predefined date.

13. The method as claimed in claim 7, wherein the wind turbine has same standard controlling control variables as further units of a same group and different standard controlling control variables than the units of other groups.

14. A wind turbine, STATCOM unit, or energy store configured to carry out the method as claimed in claim 7.

15. The method as claimed in claim 7, wherein the unit is assigned to at least one of the first and second groups of a wind park, wherein both the first and second groups each comprise at least two units.

16. The method as claimed in claim 1, wherein the plurality of units are a plurality of wind turbines.

* * * * *